Patented Aug. 16, 1927.

1,639,599

UNITED STATES PATENT OFFICE.

LOUIS FRANCIS, OF MIAMI, FLORIDA.

PAINT FORMULA.

No Drawing. Application filed February 1, 1926. Serial No. 85,391.

This invention relates to an undercoating and overcoating having water-proofing qualities.

An object of the invention is the provision of a paint which is adapted to be employed as an undercoat and overcoat and which when applied to materials will prevent the action of moisture and oxygen from causing deterioration of the materials and which will also prevent bacteria from destroying fibrous materials.

A further object of the invention is the provision of a paint forming a water-proof undercoating which is transparent and which may be cheaply and economically manufactured from used inner tubes and rubber casings and a particular solvent such as rosin.

This invention will be best understood from a consideration of the following detailed description; nevertheless it is to be understood that the invention is not confined to the disclosure, being susceptible of such changes and modifications which shall define no material departure from the salient features of the invention as expressed in the appended claim.

In carrying out my invention the scrap inner tubes and casings are passed over a magnetic table to remove nails or other pieces of iron which may be imbedded in the tubes or tires and the scrap material is then passed through a grinding machine where the scrap is ground sufficiently fine for the purpose of producing the paint. 3½ parts of the ground scrap is thoroughly mixed with 5 parts of rosin and 1 part linseed oil and this mixture is boiled until the rubber has been dissolved and the liquid is of a smooth consistency.

The linseed oil may be omitted and 3½ parts of the ground scrap rubber is mixed with 5 parts of rosin and boiled until all the rubber has been dissolved. The mixture thus formed may be thinned to any consistency by the use of gasoline.

The composition thus produced forms an excellent undercoat and will resist the ravages of weather for a considerably greater period than varnishes or paints and since the liquid is substantially transparent it is not suitable by itself as a paint for decorative purposes, but when used as an undercoat any other top coats may be employed for decorative purposes.

The linseed oil is only employed in the composition for preventing in a large measure in the earlier stages of the mixing the adhesiveness of the material to the container in which the paint is being made, and after the paint has been completed there is no necessity for the use of any further linseed oil. The proportions which have been set forth in the specification are merely approximate proportions which may be varied in accordance with the needs or the requirements for which the paint may be employed.

I claim:—

The process of forming a transparent paint composition which comprises finely grinding inner tubes and rubber tires, mixing approximately three and one half parts of the ground tubes and tires with approximately five parts of rosin and boiling the mixture until the ground inner tubes and casings have been dissolved.

LOUIS FRANCIS.